United States Patent

Sugita et al.

[11] Patent Number: 5,778,360
[45] Date of Patent: Jul. 7, 1998

[54] METHOD AND APPARATUS FOR ENCODING AND DECODING A DATA UNIT WHOSE STRUCTURE IS DEFINED BY A DESCRIPTION CONFORMING TO ABSTRACT SYNTAX ACCORDING TO A PRESCRIBED ENCODING RULE

[75] Inventors: Kiyoshi Sugita; Noriyuki Yokoshi, both of Kawasaki, Japan

[73] Assignee: Fujitsu Limited, Kawasaki, Japan

[21] Appl. No.: 845,577

[22] Filed: Apr. 25, 1997

Related U.S. Application Data

[63] Continuation of Ser. No. 342,251, Nov. 18, 1994, abandoned.

[30] Foreign Application Priority Data

Mar. 24, 1994  [JP]  Japan .................. 6-052379

[51] Int. Cl.$^6$ .......................................... G06F 3/00
[52] U.S. Cl. .......................... 707/4; 707/1; 707/3
[58] Field of Search .................... 395/604, 603, 395/601; 707/4, 3, 1

[56] References Cited

U.S. PATENT DOCUMENTS

| | | | |
|---|---|---|---|
| 4,805,099 | 2/1989 | Huber | 364/300 |
| 4,994,998 | 2/1991 | Anezaki | 364/900 |
| 5,201,046 | 4/1993 | Golberg et al. | 395/600 |
| 5,210,535 | 5/1993 | Fujita | 341/51 |
| 5,263,137 | 11/1993 | Anezaki | 395/200 |
| 5,291,583 | 3/1994 | Bapat | 395/500 |
| 5,295,256 | 3/1994 | Bapat | 395/500 |
| 5,418,963 | 5/1995 | Anezaki et al. | 395/700 |
| 5,418,972 | 5/1995 | Takeuchi et al. | 395/800 |
| 5,504,886 | 4/1996 | Chang et al. | 395/600 |
| 5,506,985 | 4/1996 | Motoyama et al. | 395/600 |

FOREIGN PATENT DOCUMENTS

| | | |
|---|---|---|
| 0327058 | 2/1989 | European Pat. Off. . |
| 0513799 | 5/1992 | European Pat. Off. . |
| 0567137 | 4/1993 | European Pat. Off. . |
| 158070 | 8/1977 | United Kingdom . |

*Primary Examiner*—Thomas G. Black
*Assistant Examiner*—Jean R. Homere
*Attorney, Agent, or Firm*—Greer, Burns & Crain, Ltd.

[57] ABSTRACT

Records corresponding to the label used in an abstract syntax are entered in a database, and decoding or encoding is performed while retrieving records one after another in accordance with their contents. Each record has a type identifier field for storing a type identifier name that identifies the type assigned to a label, an additional information field for storing additional information that additionally specifies the processing to be performed, a referenced label field for storing a label to be referenced, a value information field for storing value information, and a value field for storing a value.

28 Claims, 6 Drawing Sheets

Fig. 2

| TYPE IDENTIFIER NAME | TYPE IN ASN.1 | DETAILES OF ROCESSING |
|---|---|---|
| BOLN<br>INT<br>ENUM<br>OCTS<br>GTIME | BOOLEAN<br>INTEGER<br>ENUMERATED<br>OCTET STRING<br>GENERALIZED TIME | CHOICE IS MADE FROM SELECTABLE "REFERENCED LABELS".<br>IF NO SUCH REFERENCED LABELS, CORRESPONDENCE IS MADE TO USER DATA OF SPECIFIED NUMBER OF BYTES. |
| NULL | NULL | NULL INFORMATION IS MADE TO CORRESPOND. |
| SEQ | SEQUENCE (OF) | "REFERENCED LABEL" IS REFERENCED IN ASCENDING ORDER OF "ADDITIONAL INFORMATION" NUMBERS. |
| SET | SET (OF) | "REFERENCED LABEL" IS REPEATEDLY REFERENCED. |
| CHOICE | CHOICE | CHOICE IS MADE FROM SELECTABLE "REFERENCED LABELS". |
| SID<br>EID<br>AID | DATA DEFINED BY "ANY DEFINED BY" | "REFERENCED LABEL" IS REFERENCED IN ACCORDANCE WITH OPERATION-VALUE ID (SID), EVENT-TYPE ID (EID), OR ACTION-TYPE ID (AID) OF "ADDITIONAL INFORMATION". |
| REF | — | "REFERENCED LABEL" IS REFERENCED UNIQUELY. |

Fig. 3

```
ROSEapdus    ::= CHOICE  {
                roiv-apdu [1] IMPLICIT ROIVapdu
                rors-apdu [2] IMPLICIT RORSapdu
                roer-apdu [3] IMPLICIT ROERapdu
                rorj-apdu [4] IMPLICIT RORJapdu }

ROIVapdu    ::= SEQENCE {
                invokeID   InvokeIDType,
                linked-ID [0] IMPLICIT invokedIDType OPTIONAL,
                operation-value OPERATION,
                argument ANY DEFINED BY operation-value OPTIONAL  }

InvokeIDType   ::= INTEGER invokedIDType  ::= INTEGER

OPERATION      ::= INTEGER  {
                m-Event-Report    (0),
                m-Get             (3),
                m-Set             (4),
                m-Action          (6),
                m-Create          (8),
                m-Delete          (9)  } m-Get-apdu    ::= attributeID attributeID   ::= OCTET STRING
```

Fig.4

| LABEL | TYPE IDENTIFIER NAME | ADDITIONAL INFORMATION | REFFERENCED LABEL | VALUE INFORMATION | VALUE | |
|---|---|---|---|---|---|---|
| ROSEapdus | CHOICE | 1 | ROIVapdu | 1 | 1 | 30 |
| ROSEapdus | CHOICE | 1 | RORSapdu | 1 | 2 | 31 |
| ROSEapdus | CHOICE | 1 | ROERapdu | 1 | 3 | 32 |
| ROSEapdus | CHOICE | 1 | RORJapdu | 1 | 4 | 33 |
| ROIVapdu | SEQ | 1 | InvokeIDType | 0 | 0 | 34 |
| ROIVapdu | SEQ | 2 | invokedIDType | 17 | 0 | 35 |
| ROIVapdu | SEQ | 3 | OPERATION | 0 | 0 | 36 |
| ROIVapdu | SEQ | 4 | argument | 16 | 0 | 37 |
| InvokeIDType | INT | 0 | | 1 | 0 | 38 |
| invokedIDType | INT | 0 | | 1 | 0 | 39 |
| OPERATION | INT | 1 | m-Event-Report | 1 | 0 | 40 |
| OPERATION | INT | 1 | m-Get | 1 | 3 | 41 |
| OPERATION | INT | 1 | m-Set | 1 | 4 | 42 |
| OPERATION | INT | 1 | m-Action | 1 | 6 | 43 |
| OPERATION | INT | 1 | m-Create | 1 | 8 | 44 |
| OPERATION | INT | 1 | m-Delete | 1 | 9 | 45 |
| argument | SID | 0 | m-Event-Rep-apdu | 0 | 0 | 46 |
| argument | SID | 3 | m-Get-apdu | 0 | 0 | 47 |
| argument | SID | 4 | m-Set-apdu | 0 | 0 | 48 |
| argument | SID | 6 | m-Action-apdu | 0 | 0 | 49 |
| argument | SID | 8 | m-Create-apdu | 0 | 0 | 50 |
| argument | SID | 9 | m-Delete-apdu | 0 | 0 | 51 |
| m-Get-apdu | REF | 0 | attributeID | 0 | 0 | 52 |
| attributeID | OCTS | 0 | | 3 | 0 | 53 |

Fig.5

| TYPE IDENTIFIER NAME | ADDITIONAL INFORMATION | REMARKS |
|---|---|---|
| SEQ | REFERENCE SEQUENCE NUMBER | "0" INDICATES "SEQ OF" TYPE. |
| SET | 1: (FIXED) | "0" INDICATES "SET OF" TYPE. |
| BOLN<br>INT<br>OCTS<br>GTIME | 0: NON-SELECTABLE<br>1: SELECTABLE | IF "ADDITIONAL INFORMATION" IN ALL RETRIEVED RECORDS IS "0", IT INDICATES THAT APPLICATION PROCESS SHOULD ASSIGN VALUE. |
| ENUM<br>CHOICE<br>REF | 0: NON-SELECTABLE<br>1: SELECTABLE | IF "ADDITIONAL INFORMATION" IN ALL RETRIEVED RECORDS IS "0", IT IS TREATED AS NULL VALUE. |
| SID | OPERATION-VALUE ID NUMBER | |
| EID | EVENT-TYPE ID VALUE | |
| AID | ACTION-TYPE ID VALUE | |
| NULL | | |

Fig. 6

| TYPE IDENTIFIER NAME | REFERENCED LABEL | VALUE INFORMATION | VALUE |
|---|---|---|---|
| SEQ<br>SET<br>CHOICE<br>REF<br>SID<br>EID<br>AID | REFERENCED VARIABLE NAME | 0: NO TAG<br>16: NO TAG (OPTIONAL/DEFAULT SPECIFICATION)<br>1: IMPLICIT TAG<br>2: EXPLICIT TAG<br>17: IMPLICIT TAG (OPTIONAL/DEFAULT SPECIFICATION)<br>18: EXPLICIT TAG (OPTIONAL/DEFAULT SPECIFICATION) | 0<br><br>TAG NUMBER |
| BOLN<br>INT<br>OCTS<br>GTIME<br>ENUM | VALUE NAME OR GENERIC NAME OF VALUE | NUMBER OF BYTES OF VALUE | DEFINED VALUE OR USER DATA |
| NULL | | 0 | 0 |

METHOD AND APPARATUS FOR ENCODING AND DECODING A DATA UNIT WHOSE STRUCTURE IS DEFINED BY A DESCRIPTION CONFORMING TO ABSTRACT SYNTAX ACCORDING TO A PRESCRIBED ENCODING RULE

This application is a continuation of application Ser. No. 08/342,251 filed on Nov. 18, 1994, now abandoned.

BACKGROUND OF THE INVENTION

1. Field of the Invention

The present invention relates to a method and apparatus for converting data between an abstract syntax and transfer system and, more particularly, to the generation of data conforming to a prescribed transfer syntax in accordance with a prescribed encoding rule from data whose structure is defined in a prescribed abstract syntax notation, and also relates to the decoding of data in said transfer syntax format.

2. Description of the Related Art

In the Open Systems Interconnection (OSI) Reference Model, the presentation layer carries out data conversion between an abstract syntax format used at the application layer and a transfer syntax format actually used for data transfer. For example, in network management protocols such as the common management information protocol (CMIP), CMIP over TCP/IP (CMOT), and simple network management protocol (SNMP), to permit network management under multi-vendor environments where data transfer machines from different manufacturers are connected, the structure of an application protocol data unit (APDU) is defined using a description conforming to a standardized abstract syntax notation known as abstract syntax notation number one (ASN.1), and at the presentation layer, encoding and decoding are performed in accordance with the ASN.1 basic encoding rule (ASN.1 BER).

In ASN.1, the use of variables of a structured type, such as a choice type (CHOICE) that indicates a value selected from a set of values, is permitted in addition to the use of variables of a simple type, such as an integer type (INTEGER) and a true or false logic type (BOOLEAN). In order to generate data in a transfer syntax format from a protocol data unit (PDU) whose structure is defined in an abstract syntax notation such as ASN.1 where the use of variables of a structured type is permitted, and also to perform the inverse processing, one approach that can be considered is to store conversion tables associated with individual variables of structured type used in the abstract syntax and perform encoding and decoding operations by referencing these tables.

This ordinary method of storing the conversion tables in the main memory, however, presents a problem in terms of memory resources available for storage. On the other hand, if the conversion tables are to be stored as files on an external storage device, there arises a problem in terms of the processing capacity since a large number of files are required for storage of such tables. Furthermore, with any of these methods, data management is difficult and it is not easy to update the tables when data structure definitions are changed or added.

SUMMARY OF THE INVENTION

It is, accordingly, an object of the present invention to overcome the above problems and provide a method and apparatus for efficiently generating data for transfer in a transfer syntax in accordance with a prescribed encoding rule from data whose structure is defined using a description conforming to an abstract syntax notation, and for efficiently analyzing and decoding the transferred data.

According to the present invention, there is provided a method of encoding a data unit, whose structure is defined by a description including a label and an assignment thereto conforming to a prescribed abstract syntax notation, into data for transfer conforming to a prescribed transfer syntax, comprising the steps of: entering a plurality of records, each containing the label and an assignment thereto, into a database; retrieving records entered in the database one after another by reference to the assignments contained in the records; and encoding the data unit in accordance with the assignments contained in the retrieved records.

According to the present invention, there is also provided a method of decoding transferred data constructed conforming to a prescribed transfer syntax and whose structure is defined by a description including a label and an assignment thereto conforming to a prescribed abstract syntax notation, comprising the steps of: entering a plurality of records, each containing the label and an assignment thereto, into a database; retrieving records entered in the database one after another by reference to the assignments contained in the records; and decoding the transferred data in accordance with the assignments contained in the retrieved records.

According to the present invention, there is also provided an apparatus for encoding a data unit, whose structure is defined by a description including a label and an assignment thereto conforming to a prescribed abstract syntax notation, into data for transfer conforming to a prescribed transfer syntax, comprising: a database into which a plurality of records, each containing the label and an assignment thereto, are entered; means for retrieving records entered in the database one after another by reference to the assignments contained in the records; and means for encoding the data unit in accordance with the assignments contained in the retrieved records.

According to the present invention, there is also provided an apparatus for decoding transferred data constructed conforming to a prescribed transfer syntax and whose structure is defined by a description including a label and an assignment thereto conforming to a prescribed abstract syntax notation, comprising: a database in which a plurality of records, each containing the label and an assignment thereto, are entered; means for retrieving records entered in the database one after another by reference to the assignments contained in the records; and means for decoding the transferred data in accordance with the assignments contained in the retrieved records.

BRIEF DESCRIPTION OF THE DRAWINGS

FIG. 2 is a diagram for explaining a type identifier name field;

FIG. 3 is a diagram showing an example of an abstract syntax;

FIG. 4 is a diagram showing the structure of a database corresponding to the abstract syntax shown in FIG. 3;

FIG. 5 is a diagram for explaining an additional information field; and

FIG. 6 is a diagram for explaining referenced label, value information, and value fields.

DESCRIPTION OF THE PREFERRED EMBODIMENTS

Figure 1:
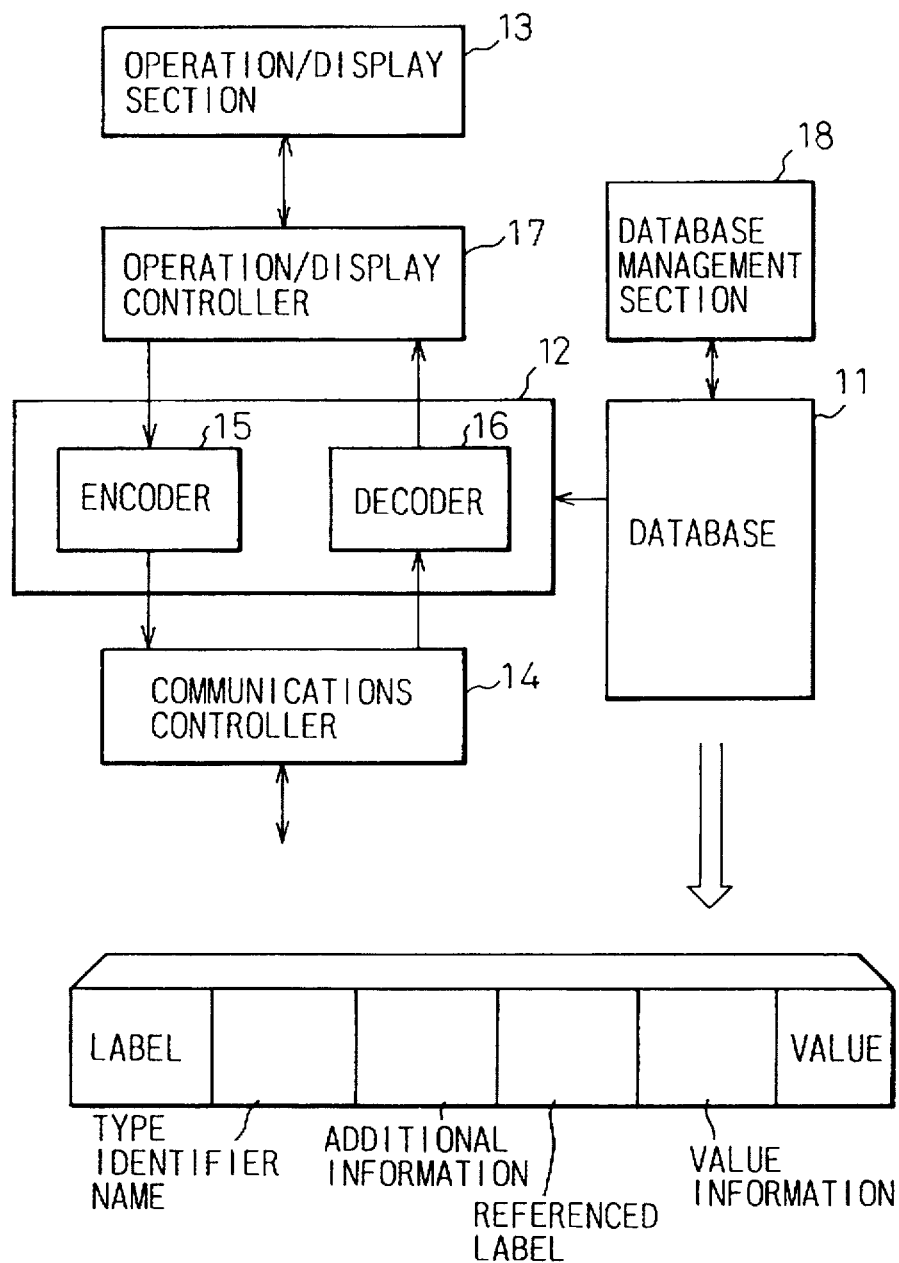
FIG. 1 is a block diagram showing a network management station as an example of an apparatus incorporating an encoder/decoder according to one embodiment of the present invention.

FIG. 1 is a block diagram showing the configuration of a network management station as an example of an apparatus incorporating an encoder/decoder according to one embodiment of the present invention.

In the figure, 11 is a database, 12 is an encoder/decoder section, 13 is an operation/display section, 14 is a communications controller, 15 is an encoder, 16 is a decoder, 17 is an operation/display controller, and 18 is a database management section. The database management section 18 is responsible for the management of the database 11, and data is updated as necessary. The encoder/decoder section 12 includes the encoder 15 and decoder 16, and performs conversion between an abstract syntax and a transfer syntax by referencing the database 11. The operation/display section 13 includes a keyboard at which an operator performs input operations, and a display device for displaying the result of data retrieval from the database 11, input information, etc. The operation/display controller 17 provides an interface between the encoder/decoder section 12 and the operation/display section 13. Information input by an operator via the operation/display section 13, is supplied to the encoder/decoder section 12 via the operation/display controller 17, based on which information the encoder 15 searches the database 11, and the result of the search is supplied via the operation/display controller 17 to the operation/display section 13 for display. On the other hand, transferred data received at the communications controller 14 is supplied to the encoder/decoder section 12, and converted in the decoder 16 into an abstract syntax format by referencing the database 11. The functions of the encoder/decoder section 12, communications controller 14, and operation/display controller 17 can be implemented, for example, using software in a personal computer or a workstation.

Each record stored in the database 11 consists of six fields, a "label" field, a "type identifier name" field, an "additional information" field, a "referenced label" field, a "value information" field, and a "value" field, as shown in FIG. 1. The "label" field carries a label assigned to a variable or a constant included in the data structure definition in ASN.1. As shown in FIG. 2, the "type identifier name" generally has a one-to-one correspondence with the type in ASN.1, but there are some names, such as SID and EID, that do not correspond on a one-to-one basis. The type identifier names are classified into several groups, as shown in FIG. 2, details of processing being different for different groups. The details of processing will be described later.

To facilitate understanding, the relationship between data structure definitions in an abstract syntax and records stored in the database 11 will be explained by way of example.

When a protocol data unit (PDU) is defined in the abstract syntax shown in FIG. 3, for example, in the present invention the records shown in FIG. 4 are stored in the database 11 for the encoding and decoding of the PDU. In the abstract syntax example shown in FIG. 3, part of the definition in ASN.1 of the PDU for the remote operations service element (ROSE) providing the remote operation service that the common management information service element (CMISE) uses in the previously mentioned CMIP, as well as part of the definition of the PDU for the CMIP, is shown in a simplified form for convenience of explanation. As can be seen from the example of FIG. 4, for variables ROSEapdus and ROIVapdu assigned thereto a structured type such as "CHOICE" or "SEQ", records (30 to 33 or 34 to 37) the number of which is equal to that of available choices or component elements are stored with the same label. In cases where assignable values are enumerated in an abstract syntax, such as a record assigned thereto a label "OPERATION", records (40 to 45) the number of which is equal to that of assignable values are stored. In the case of an "ANY DEFINED BY" type (type identifier name is SID, EID, or AID) such as a record "argument", records (46 to 51) the number of which is equal to that of values that define the type are stored.

The third field in each record carries "additional information" that additionally specifies the details of processing. As shown in FIG. 5, the additional information has different meanings for different type identifier names. If the type identifier name is "SEQ", for example, the additional information field carries an integer (1, 2, ...) which indicates the order of appearance of the component element of the SEQUENCE type variable corresponding to the record. In the example shown in FIG. 4, the four records with the label "ROIVapdu" carry additional information "1" to "4". Additional information "0" indicates that the associated variable is of a "SEQUENCE OF" type. For the type identifier name "SET", if the additional information is "1", this means a "SET" type, and if it is "0", this means a "SET OF" type. If the type identifier name is "BOLN", "INT", "OCTS", or "GTIME", the additional information indicates that, of the plurality of records having the same label, those carrying additional information "0" correspond to a value stored in the database but not used currently, and that the user or application process should select a value from those carrying additional information "1". If the additional information in all records is "0", or if there is only one record and its additional information is "0", this means that the user or application process should assign an actual value. If the type identifier name is "ENUM", "CHOICE", or "REF", the additional information indicates that, of the plurality of records having the same label, those carrying additional information "0" correspond to a choice stored in the database but not used currently, and that the user or application process should make a choice from those carrying additional information "1". If the additional information in all records is "0", it is treated as a NULL value. If the type identifier name is "SID", "EID", or "AID", the additional information indicates the operation-value ID number, the event-type ID number, or the action-type ID number corresponding to the associated record.

The "referenced label", "value information", and "value" fields also have different meanings for different type identifier names. If the type identifier name is "SEQ", "SET", "CHOICE", "REF", "SID", "EID", or "AID", the referenced label field carries the label of the component element or choice corresponding to the record. If the value information field carries "0" or "16", this means that no tag is assigned to the corresponding component element, and "0" is stored in the value field. If the value information field carries "0", this further means that there is an optional or default specification. If the value information field carries "1", "2", "17", or "18", this means an implicit tag, an explicit tag, an implicit tag with an optional/default specification, or an explicit tag with an optional/default specification, respectively, and the tag number is stored in the value field. If the type identifier name is "BOLN", "INT", "OCTS", "GTIME", or "ENUM", the referenced label field carries the label assigned to the value, and the number of bytes of the value is stored in the value information field while the value defined for the label is stored in the value field. The above is the case where the additional information field carries "1".

On the other hand, if the additional information field carries "0", the value is assigned by the user or application process, as earlier described.

Referring back to FIG. 2, when the type identifier name is "BOLN", "INT", "ENUM", "OCTS", or "GTIME", as described above, if the additional information field carries "1", the user or application process selects a value from a plurality of values; if that field carries "0", then the user or application process enters a value in the number of bytes specified in the value information field. If the type identifier name is "SEQ", the label carried in the referenced label field is referenced in the order of the value stored in the additional information field. If the type identifier name is "SET", the referenced label is repeatedly referenced. If the type identifier name is "CHOICE", the user or application process chooses from the referenced labels of the records whose additional information field carries "1". If the type identifier name is "SID", "EID", or "AID", the referenced label is referenced in accordance with the operation-value ID, event-type ID, or action-type ID, respectively, of the additional information. If the type identifier name is "REF", the referenced label is uniquely referenced.

The roles of the fields in each record stored in the database 11, described above, will be more fully understood by proceeding through the following detailed description of the encoding and decoding processes.

First, the encoding process when the APDU structure is defined in the abstract syntax shown in FIG. 3 is described. The records shown in FIG. 4, constructed based on the abstract syntax of FIG. 3, are stored in the database 11. In encoding, first the records with label "ROSEapdus" and additional information "1", the four records 30 to 33 in the example of FIG. 4, are retrieved. The referenced labels, "ROIVapdu", "RORSapdu", "ROERapdu", and "RORJapdu", of the four retrieved records 30 to 33 are displayed on the operation/display section 13 (or output to the application process) for selection by the operator (or the application process). It is assumed here that "ROIVapdu" is selected. Since the "value information" is "1" and the "value" is "1" for the record 30 with referenced label "ROIVapdu", an "implicit tag" is specified for the variable ROIVapdu, and the tag number is "1". Next, a search is made for records having the label "ROIVapdu". Since the type identifier name of the retrieved records 34 to 37 is "SEQ", ROIVapdu is of type "SEQUENCE", but because of the specification of the implicit tag, type "SEQUENCE" is not encoded, and the T field in the transfer syntax is defined as [CONTEXT-SPECIFIC: 10; Structured: 1; Tag number 1: 00001], which is encoded as "A1h". Since the type identifier name of ROIVapdu is "SEQ", SEQUENCE type processing is performed. More specifically, since the referenced label of the record 34 having the smallest "additional information" value of the records 34 to 37 is "InvokeIDType", search is made for records having label "InvokeIDType". The record 38 is retrieved, whose "type identifier name" is "INT" and "additional information" is "0", so that the user or application process is requested to enter an integer value. Assuming that "ssh" is entered, it is encoded as "02h, 01h, ssh". "02h" is a universal tag of an integer type and "01h" the number of bytes of the entered integer. Of the remaining records 35 to 37 with label "ROIVapdu", the record 35 has the smallest additional information value. The value information of the record 35 is 17, which means that there is an optional/default specification, so that it is left to the user or application process to decide whether encoding is needed or not. If it is decided that encoding is not needed, the processing of this record is terminated. Of the remaining records 36 to 37 with label "ROIVapdu", the record 36 has the smaller additional information value. Since the referenced label of the record 36 is "OPERATION", a search is made for records having the label "OPERATION". The type identifier name of the retrieved six records 40 to 45 is "INT" and their additional information is "1"; therefore, the user or application process is made to select the one it needs from the referenced labels of these records. It is assumed here that "m-Get" is selected. Since the "value" of the record 41 having that label is "3", it is encoded as "02h", "01h", "03h". The only remaining record with the label "ROIVapdu" is the record 37. The referenced label of the record 37 is "argument" and its value information is "16". Since the value information of 16 means that there is an optional/default specification, the user or application process is made to decide whether encoding is needed or not. If it is decided that encoding is needed, search is made for records having label "argument". Six records 46 to 51 are retrieved, whose type identifier name is "SID". Of the records 46 to 51, the record 47, which has additional information equal to the value "3" selected as the value of "OPERATION", is selected. Since the referenced label of the record 47 is "m-Get-apdu", search is made for records having label "m-Get-apdu". Since the type identifier name of the retrieved record 52 is "REF" and its referenced label is "attributeID", a further search is made for records having label "attributeID". Record 53 is retrieved, whose type identifier name is "OCTS", additional information "0", and value information "3"; therefore, the user or application process is requested to enter a 3-byte character string value. Assuming that "xx yy zzh" is entered, it is encoded as "04h", "03h", "xx yy zzh". "04h" is a universal tag of "OCTET STRING" and "03h" the byte length of the character string data. With the above procedure, the SEQUENCE type processing of "ROIVapdu" is completed. Since the encoded data length of ROIVapdu is "0Bh" (11), the final code is given as "A1 0B 02 01 ss 02 01 03 04 03 xx yy zzh".

The decoding process in the present invention, that is, the process of analyzing transferred data constructed in a transfer syntax, will be described below by taking as an example the decoding of the transferred data "A1 0B 02 01 ss 02 01 03 04 03 xx yy zzh" whose structure is defined in the abstract syntax shown in FIG. 3. As in the encoding process, first the records with label "ROSEapdus" and additional information "1" are retrieved. The type identifier name of the retrieved records is "CHOICE", and "A1h" at the start of the transferred data means that the tag class is CONTEXT-SPECIFIC, it is a structured type, i.e. nested structure, and the tag number is 1. Accordingly, the record 30 whose value information is neither "0" or "16" and whose value is "1" is selected from the retrieved records. This indicates that ROIVapdu has been selected, and since the value information is "1", it is found that the encoding of the universal tag has been omitted. Next, a search is made for records having the label "ROIVapdu", as a result of which the records 34 to 37 are retrieved. The type identifier name of the records 34 to 37 is "SEQ", but from the above, it is found that the universal tag of "SEQUENCE" is omitted. Since the value information of the record 34 whose additional information value is the smallest of the records 34 to 37 is "0" and its referenced label is "InvokeIDType", a search is made for records having label "InvokeIDType". Record 38 is retrieved, whose type identifier name is "INT", additional information "0", and value information "1". These coincide with the third and fourth bytes, "02h" and "01h", of the transferred data, and it is found that InvokeID is "ss" at the fifth byte of the transferred data. Since the value information of the next record 35 is "17", it is found that the record has an implicit tag, there is an optional/default specification, the value is "0", and therefore the tag number is "0". However, since there is no match with "02h" at the sixth byte of the transferred data, it is found that the encoding has been omitted. Since the value information of the next record 36 is "0" and its referenced label is "OPERATION", search is made for records having label "OPERATION". Records 40 to 45 are retrieved, whose type identifier name is "INT" and value information "1". These coincide with the sixth and seventh bytes, "02h" and "01h", of the transferred data. Since the eighth byte of the transferred data is "03h", from the record 41 whose value coincides with that value it is found that it indicates m-Get. The value information of the next record 37 is "16", which means that there is an optional/default specification but there is no tag. Accordingly, a search is made for records having the referenced label "argument" of the record 37 as their label. From the retrieved records 46 to 51, a record whose additional information value is equal to the value "3" of m-Get is selected. Since the referenced label of the selected record 47 is "m-Get-apdu", a search is made for records having label "m-Get-apdu". Since the type identifier name of the retrieved record 52 is "REF", a further search is made for records having the referenced label "attributeID" of the record 52 as their label. Record 53 is retrieved, whose type identifier name is "OCTS" and value information is "3". These coincide with the ninth and 10th bytes, "04h" and "03h", of the transferred data, and it is found that argument is not omitted. From the transferred data, it is found that m-Get-apdu is "xx yy zzh" at the 11th to 13th bytes. With the above procedure, the analysis of all data of data length "0B" is completed. The result of the decoding is that, in the abstract syntax shown in FIG. 3, ROIVapdu is selected for ROSEapdus and, of the component elements of ROIVapdu, invokeID is "ss", linked-ID is omitted, operation-value is "m-Get", and argument is "xx yy zzh".

The claimed invention is:

1. A method of generating data for transfer conforming to a prescribed transfer syntax from a data unit, whose structure is defined by a description including a label and an assignment thereto conforming to a prescribed abstract syntax notation, comprising the steps of:

generating a plurality of records based on the description, each record containing the label, at least one of the records containing a referenced label as the assignment to the plurality of records;

entering the records into a database;

successively retrieving records entered in the database one after another by reference to the referenced label;

inputting contents of the data unit according to the assignments contained in the retrieved records; and encoding the contents of the data unit in accordance with a prescribed encoding rule.

2. A method according to claim 1, wherein each of the records entered in the database has a first field for storing said label, a second field for storing a type identifier name that identifies the type assigned to the label, and a third field for storing said referenced label, and in the step of inputting, the contents of the data unit are inputted in accordance with the contents of the second field.

3. A method according to claim 2, wherein each of the records entered in the database further has a fourth field for storing additional information that additionally specifies details of the assignment, a fifth field for storing value information that specifies the type of a tag or the number of bytes of a value thereof, and a sixth field for storing the value, and in the step of inputting, the contents of the data unit are inputted further on the basis of the contents of the fourth, fifth, and sixth fields.

4. A method of analyzing transferred data constructed conforming to a prescribed transfer syntax and whose structure is defined by a description including a label and an assignment thereto conforming to a prescribed abstract syntax notation, comprising the steps of:

generating a plurality of records based on the description, each record containing the label, at least one of the records containing a referenced label as the assignment to the plurality of records;

entering the records into a database;

successively retrieving records entered in the database one after another by reference to the referenced label contained in each record;

identifying contents of the data unit in the transferred data according to the assignments contained in the retrieved records and according to a prescribed decoding rule; and decoding the identified contents of the data unit in accordance with the decoding rule.

5. A method according to claim 4, wherein each of the records entered in the database has a first field for storing said label, a second field for storing a type identifier name that identifies the type assigned to the label, and a third field for storing the referenced label, and in the step of identifying, the contents of the data unit are identified in accordance with the contents of the second field.

6. A method according to claim 5, wherein each of the records entered in the database further has a fourth field for storing additional information that additionally specifies details of the assignment, a fifth field for storing value information that specifies the type of a tag or the number of bytes of a value thereof, and a sixth field for storing the value, and in the step of identifying, the contents of the data unit are identified further on the basis of the contents of the fourth, fifth, and sixth fields.

7. An apparatus for generating data for transfer conforming to a prescribed transfer syntax from a data unit, whose structure is defined by a description including a label and an assignment thereto conforming to a prescribed abstract syntax notation, into data for transfer conforming to a prescribed transfer syntax, comprising:

a database into which a plurality of records generated based on the description, each record containing the label and an assignment thereto, are entered, at least one of the records containing a referenced label as the assignment;

means for successively retrieving records entered in the database one after another by reference to the referenced label contained in each record;

means for inputting contents of the data unit according to the assignments contained in the retrieved records; and means for encoding the contents of the data unit in accordance with a prescribed encoding rule.

8. An apparatus according to claim 7, wherein each of the records entered in the database has a first field for storing said label, a second field for storing a type identifier name that identifies the type assigned to the label, and a third field for storing the referenced label, and the inputting means inputs the contents of the data unit in accordance with the contents of the second field.

9. An apparatus according to claim 8, wherein each of the records entered in the database further has a fourth field for storing additional information that additionally specifies details of the assignment, a fifth field for storing value information that specifies the type of a tag or the number of bytes of a value thereof, and a sixth field for storing the value, and the inputting means inputs the contents of the data unit further on the basis of the contents of the fourth, fifth, and sixth fields.

10. An apparatus for analyzing transferred data constructed conforming to a prescribed transfer syntax and whose structure is defined by a description including a label and an assignment thereto conforming to a prescribed abstract syntax notation, comprising:

a database in which a plurality of records generated based on the description, each record containing the label and an assignment thereto, are entered, at least one of the records containing a referenced label as the assignment;

means for successively retrieving records entered in the database one after another by reference to the referenced label contained in each record;

means for identifying contents of the data unit in the transferred data according to the assignments contained in the retrieved records and according to a prescribed encoding rule; and means for decoding the identified contents of the data unit in accordance with the encoding rule.

11. An apparatus according to claim 10, wherein each of the records entered in the database has a first field for storing said label, a second field for storing a type identifier name that identifies the type assigned to the label, and a third field for storing the referenced label, and the identifying means identifies the contents of the data unit in accordance with the contents of the second field.

12. An apparatus according to claim 11, wherein each of the records entered in the database further has a fourth field for storing additional information that additionally specifies details of the assignment, a fifth field for storing value information that specifies the type of a tag or the number of bytes of a value thereof, and a sixth field for storing the value, and the identifying means identifies the contents of the data unit further on the basis of the contents of the fourth, fifth, and sixth fields.

13. A method of generating data for transfer conforming to a prescribed transfer syntax from a data unit, whose structure is defined by a description including a label and an assignment thereto conforming to a prescribed abstract syntax notation, comprising the steps of:

entering a plurality of records, each record containing the label and an assignment thereto, into a database, at least one of the records containing a referenced label as the assignment, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label;

inputting contents of the data unit in accordance with the contents of the second, fourth, fifth, and sixth fields of the retrieved records; and encoding the contents of the data unit in accordance with a prescribed encoding rule;

wherein the assignment in the abstract syntax notation includes an assignment of a choice type that allows selection of one of a plurality of options, and in the record entry step, a plurality of records are entered which respectively correspond to the respective options and which carry the same label in the first field.

14. A method of generating data for transfer conforming to a prescribed transfer syntax from a data unit, whose structure is defined by a description including a label and an assignment thereto conforming to a prescribed abstract syntax notation, comprising the steps of:

entering a plurality of records, each record containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label;

inputting contents of the data unit in accordance with the contents of the second, fourth, fifth, and sixth fields of the retrieved records; and encoding the contents of the data unit in accordance with a prescribed encoding rule;

wherein the assignment in the abstract syntax notation includes an assignment of a sequence type having a sequence of a plurality of component elements, and in the record entry step, a plurality of records are entered which respectively correspond to the respective component elements and which carry the same label in the first field and the order in the sequence in the fourth field.

15. A method of generating data for transfer conforming to a prescribed transfer syntax from a data unit, whose structure is defined by a description including a label and an assignment thereto conforming to a prescribed abstract syntax notation, comprising the steps of:

entering a plurality of records, each record containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label;

inputting contents of the data unit in accordance with the contents of the second, fourth, fifth, and sixth fields of the retrieved records; and encoding the contents of the data unit in accordance with a prescribed encoding rule;

wherein the assignment in the abstract syntax notation includes an assignment of a plurality of enumerated values, and in the record entry step, a plurality of records are entered which correspond to the respective enumerated values and which carry the same label in the first field and the respective enumerated values in the sixth field.

16. A method of analyzing transferred data constructed conforming to a prescribed transfer syntax and whose structure is defined by a description including a label and an assignment thereto conforming to a prescribed abstract syntax notation, comprising the steps of:

entering a plurality of records, each containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label contained in each record;

identifying contents of the data unit in the transferred data in accordance with the contents of the second, fourth, fifth, and sixth fields and according to a prescribed decoding rule; and decoding the identified contents of the data unit in accordance with the decoding rule;

wherein the assignment in the abstract syntax notation includes an assignment of a choice type that allows selection of one of a plurality of options, and in the record entry step, a plurality of records are entered which correspond to the respective options and which carry the same label in the first field.

17. A method of analyzing transferred data constructed conforming to a prescribed transfer syntax and whose structure is defined by a description including a label and an assignment thereto conforming to a prescribed abstract syntax notation, comprising the steps of:

entering a plurality of records, each containing the label and an assignment thereto, into a database, at least one of the records containing a referenced label as the assignment, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label contained in each record;

identifying contents of the data unit in the transferred data in accordance with the contents of the second, fourth, fifth, and sixth fields and according to a prescribed decoding rule; and decoding the identified contents of the data unit in accordance with the decoding rule;

wherein the assignment in the abstract syntax notation includes an assignment of a sequence type having a sequence of a plurality of component elements, and in the record entry step, a plurality of records are entered which respectively correspond to the respective component elements and which carry the same label in the first field and the order in the sequence in the fourth field.

18. A method of analyzing transferred data constructed conforming to a prescribed transfer syntax and whose structure is defined by a description including a label and an assignment thereto conforming to a prescribed abstract syntax notation, comprising the steps of:

entering a plurality of records, each containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label contained in each record;

identifying contents of the data unit in the transferred data in accordance with the contents of the second, fourth, fifth, and sixth fields and according to a prescribed decoding rule; and decoding the identified contents of the data unit in accordance with the decoding rule;

wherein the assignment in the abstract syntax notation includes an assignment of a plurality of enumerated values, and in the record entry step, a plurality of records are entered which respectively correspond to the respective enumerated values and which carry the same label in the first field and the respective enumerated values in the sixth field.

19. An apparatus for generating data for transfer conforming to a prescribed transfer syntax from a data unit, whose structure is defined by a description including a label and an assignment thereto conforming to a prescribed abstract syntax notation, into data for transfer conforming to a prescribed transfer syntax, comprising:

a database into which a plurality of records, each containing the label, are entered, at least one of the records containing a referenced label as the assignment to the plurality of records, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for inputting contents of the data unit in accordance with the contents of the second, fourth, fifth, and sixth fields; and means for encoding the contents of the data unit in accordance with a prescribed encoding rule;

wherein the assignment in the abstract syntax notation includes an assignment of a choice type in which one of a plurality of options is selected, and in the database, a plurality of records are entered which correspond to the respective options and which carry the same label in the first field.

20. An apparatus for generating data for transfer conforming to a prescribed transfer syntax from a data unit, whose structure is defined by a description including a label and an assignment thereto conforming to a prescribed abstract syntax notation, into data for transfer conforming to a prescribed transfer syntax, comprising:

a database into which a plurality of records, each containing the label, are entered, at least one of the records containing a referenced label as the assignment to the plurality of records, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for inputting contents of the data unit in accordance with the contents of the second, fourth, fifth, and sixth fields; and means for encoding the contents of the data unit in accordance with a prescribed encoding rule;

wherein the assignment in the abstract syntax notation includes an assignment of a sequence type having a sequence of a plurality of component elements, and in the database, a plurality of records are entered which respectively correspond to the respective component elements and which carry the same label in the first field and the order in the sequence in the fourth field.

21. An apparatus for generating data for transfer conforming to a prescribed transfer syntax from a data unit, whose structure is defined by a description including a label and an assignment thereto conforming to a prescribed abstract syntax notation, into data for transfer conforming to a prescribed transfer syntax, comprising:

a database into which a plurality of records, each containing the label, are entered, at least one of the records containing a referenced label as the assignment to the plurality of records, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for inputting contents of the data unit in accordance with the contents of the second, fourth, fifth, and sixth fields; and means for encoding the contents of the data unit in accordance with a prescribed encoding rule;

wherein the assignment in the abstract syntax notation includes an assignment of a plurality of enumerated values, and in the database, a plurality of records are entered which correspond to the respective enumerated values and which carry the same label in the first field and the respective enumerated values in the sixth field.

22. An apparatus for analyzing transferred data constructed conforming to a prescribed transfer syntax and whose structure is defined by a description including a label and an assignment thereto conforming to a prescribed abstract syntax notation, comprising:

a database in which a plurality of records, each containing the label, are entered, at least one of the records containing a referenced label as the assignment to the plurality of records, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for identifying contents of the data unit in the transferred data in accordance with the contents of the second, fourth, fifth, and sixth fields and according to a prescribed encoding rule; and means for decoding the identified contents of the data unit in accordance with the encoding rule;

wherein the assignment in the abstract syntax notation includes an assignment of a choice type that allows selection of one of a plurality of options, and in the database, a plurality of records are entered which respectively correspond to the respective options and which carry the same label in the first field.

23. A method of generating data for transfer conforming to a prescribed transfer syntax from a data unit, whose structure is defined by a description including a label and an assignment thereto conforming to a prescribed abstract syntax notation, comprising the steps of:

entering a plurality of records, each containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label;

inputting contents of the data unit in accordance with the contents of the second field; and encoding the contents of the data unit in accordance with a prescribed encoding rule;

wherein during the record entry step, a plurality of records are entered which respectively correspond to values that can be allotted to the variable and which carry the same label in the first field and the respective values in the fourth field.

24. A method of analyzing transferred data constructed conforming to a prescribed transfer syntax and whose structure is defined by a description including a label and an assignment thereto conforming to a prescribed abstract syntax notation, comprising the steps of:

entering a plurality of records, each record containing the label, into a database, at least one of the records containing a referenced label as the assignment to the plurality of records, wherein each of the records entered in the database has a first field for storing the label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

successively retrieving records entered in the database one after another by reference to the referenced label contained in each record;

identifying contents of the data unit in the transferred data in accordance with the contents of the second, fourth, fifth, and sixth fields and according to a prescribed decoding rule; and inputting contents of the data unit in accordance with the contents of the second field; and decoding the identified contents of the data unit in accordance with the decoding rule;

wherein the assignment in the abstract syntax notation includes an assignment of a type defined by a value allotted to a variable, and in the record entry step, a plurality of records are entered which respectively correspond to values that can be allotted to the variable and which carry the same label in the first field and the respective values in the fourth field.

25. An apparatus for generating data for transfer conforming to a prescribed transfer syntax from a data unit, whose structure is defined by a description including a label and an assignment thereto conforming to a prescribed abstract syntax notation, into data for transfer conforming to a prescribed transfer syntax, comprising:

a database into which a plurality of records, each containing the label and an assignment thereto, are entered, at least one of the records containing a referenced label as the assignment, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for inputting contents of the data unit in accordance with the contents of the second, fourth, fifth, and sixth fields; and means for encoding the contents of the data unit in accordance with a prescribed encoding rule;

wherein the assignment in the abstract syntax notation includes an assignment of a type defined by a value allotted to a variable, and in the database, a plurality of records are entered which respectively correspond to values that can be allotted to the variable and which carry the same label in the first field and the respective values in the fourth field.

26. An apparatus for analyzing transferred data constructed conforming to a prescribed transfer syntax and whose structure is defined by a description including a label and an assignment thereto conforming to a prescribed abstract syntax notation, comprising:

a database in which a plurality of records, each containing the label and an assignment thereto, are entered, at least one of the records containing a referenced label as the assignment, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for identifying contents of the data unit in the transferred data in accordance with the contents of the second, fourth, fifth, and sixth fields and according to a prescribed encoding rule; and means for decoding the identified contents of the data unit in accordance with the encoding rule;

wherein the assignment in the abstract syntax notation includes an assignment of a type defined by a value allotted to a variable, and in the database, a plurality of records are entered which respectively correspond to values that can be allotted to the variable and which carry the same label in the first field and the respective values in the fourth field.

27. An apparatus for analyzing transferred data constructed conforming to a prescribed transfer syntax and whose structure is defined by a description including a label and an assignment thereto conforming to a prescribed abstract syntax notation, comprising:

a database in which a plurality of records, each containing the label and an assignment thereto, are entered, at least one of the records containing a referenced label as the assignment, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for identifying contents of the data unit in the transferred data in accordance with the contents of the second, fourth, fifth, and sixth fields and according to a prescribed encoding rule; and means for decoding the identified contents of the data unit in accordance with the encoding rule;

wherein the assignment in the abstract syntax notation includes an assignment of a sequence type having a sequence of a plurality of component elements, and in the database, a plurality of records are entered which respectively correspond to the respective component elements and which carry the same label in the first field and the order in the sequence in the fourth field.

28. An apparatus for analyzing transferred data constructed conforming to a prescribed transfer syntax and whose structure is defined by a description including a label and an assignment thereto conforming to a prescribed abstract syntax notation, comprising:

a database in which a plurality of records, each containing the label and an assignment thereto, are entered, at least one of the records containing a referenced label as the assignment, wherein each of the records entered in the database has a first field for storing said label, a second field for storing a type identifier name that identifies the type assigned to the label, a third field for storing the referenced label, a fourth field for storing additional information that additionally specifies details of the assignment, a fifth field for storing value information that specifies the type of a tag or the number of bytes of a value thereof, and a sixth field for storing the value;

means for successively retrieving records entered in the database one after another by reference to the referenced label contained in each record;

means for identifying contents of the data unit in the transferred data in accordance with the contents of the second, fourth, fifth, and sixth fields and according to a prescribed encoding rule; and means for decoding the identified contents of the data unit in accordance with the encoding rule;

wherein the assignment in the abstract syntax notation includes an assignment of enumerated values, and in the database, a plurality of records are entered which respectively correspond to the respective enumerated values and which carry the same label in the first field and the respective enumerated values in the sixth field.

* * * * *

UNITED STATES PATENT AND TRADEMARK OFFICE
CERTIFICATE OF CORRECTION

PATENT NO. : 5,778,360
DATED : July 7, 1998
INVENTOR(S) : Sugita et al.

It is certified that error appears in the above-identified patent and that said Letters Patent is hereby corrected as shown below:

Title page, item Under "[56] References Cited" and

FOREIGN PATENT DOCUMENTS delete "158070" and insert --1580570-- therefor

Signed and Sealed this

Twenty-ninth Day of December, 1998

Attest:

BRUCE LEHMAN

*Attesting Officer*  *Commissioner of Patents and Trademarks*